Feb. 3, 1970 J. A. VALLÉE 3,493,962

CONVERTER FOR SELF-CLOCKING DIGITAL SIGNALS

Filed Aug. 30, 1966 2 Sheets-Sheet 1

INVENTOR:
JOHNNY A. VALLÉE
BY Carl V. Olson
ATTORNEY

Feb. 3, 1970 J. A. VALLÉE 3,493,962

CONVERTER FOR SELF-CLOCKING DIGITAL SIGNALS

Filed Aug. 30, 1966 2 Sheets-Sheet 2

INVENTOR:
JOHNNY A. VALLÉE

BY Carl V. Olson
ATTORNEY

United States Patent Office 3,493,962 Patented Feb. 3, 1970

3,493,962

CONVERTER FOR SELF-CLOCKING DIGITAL SIGNALS

Johnny A. Vallée, Juno Beach, Fla., assignor to RCA Corporation, a corporation of Delaware
Filed Aug. 30, 1966, Ser. No. 576,101
Int. Cl. H04l 3/00; H03k 13/00
U.S. Cl. 340—347 6 Claims

ABSTRACT OF THE DISCLOSURE

A decoder for converting a self-clocking signal read from a magnetic recording medium to a non-return-to-zero (NRZ) signal for use in data processing equipment. The self-clocking signal is one in which a transition occurs in the middle of a bit cell representing a "1" and a transition occurs between bit cells representing two successive "0's." The decoder includes means to extract a clock pulse wave and to insure that the phase of the clock pulse wave will, if wrong, be corrected whenever a "101" bit sequence may occur, whether intentionally in a preample, or incidentally as part of the information message.

Figure 1:
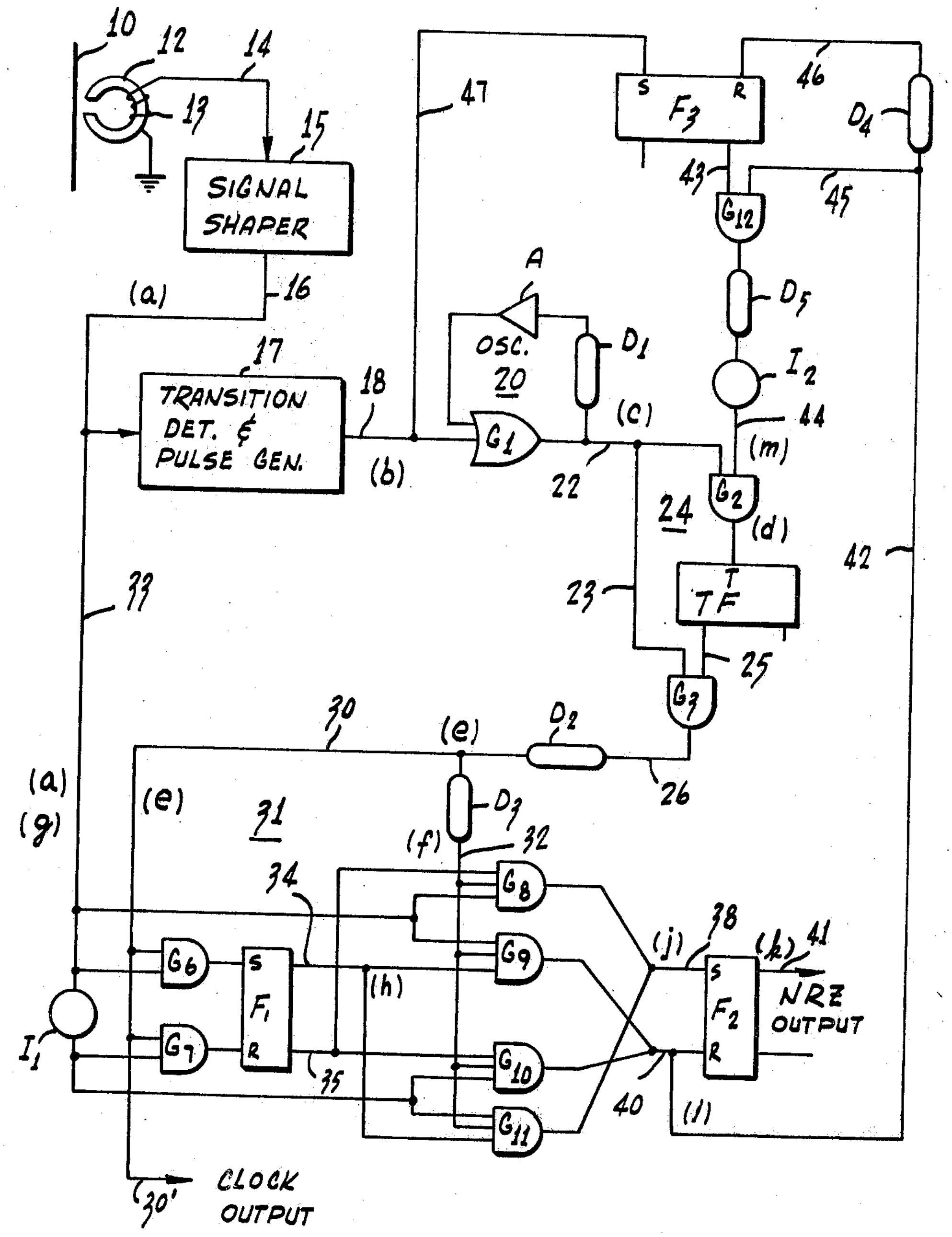

This invention relates to digital information code converters or decoders for translating an information signal in one form especially suited for recording to another form especially suited for handling by electronic circuitry. A known form of signal for recording is a self-clocking type signal in which a transition occurs in the middle of a bit cell representing a "1" and a transition occurs between bit cells representing two successive "0's."

The above-described signal is in a form or code which is particularly well suited for use in serial type recording and reproducing systems. This is so because the signal itself includes transitions which, when the signal is reproduced, can be extracted to produce a clocking or timing wave, and because the signal includes relatively few transitions so that information can be densely packed on the recording medium. A decoder or converter is normally used to translate the signal reproduced from the recording medium to a simple non-return-to-zero (NRZ) signal and a clock pulse wave suitable for application to the signal input and the shift input, respectively, of a conventional shift register.

A digital information signal in which a "1" is represented by a transition in the middle of a bit cell (a "0" is represented by the absence of a transition at the middle of a bit cell), and in which two successive bit cells both containing "0's" are separated by an intervening partition or clock transition, is sometimes called a delay modulation signal. This is because the decoder includes means to compare the signal with a delayed version of the signal to determine whether there was an intervening transition. The assignment of "1" and "0" meanings is purely arbitrary and may be reversed.

In the generation of such a delay modulation signal for recording on a medium, the transitions at the middle of a bit cell are made to represent "1" data bits and the transitions between successive "0" data bits are made to represent timing information. However, when the recorded signal is reproduced from the medium, the timing extractor circuit may interpret the "1" transitions to contain the timing information, and the other transitions to represent "1's." In this event, the decoded binary data is incorrect. To correctly decode a delay modulation signal, the extracted timing wave must not only have the correct frequency but it must also have the correct one of two possible phases.

It is known to record a preamble, for example one having all "0's" preceding an information message, and to extract a timing signal having the correct phase from the preamble. Using this arrangement, it is necessary to know when the preamble will be reproduced, and it is necessary to condition the timing extractor to establish or "lock" the phase of the timing signal solely during the presence of the all "0's" preamble. Thereafter, it is hoped that the phase of the timing wave will remain correct during the decoding of the following message portion of the signal.

It is an object of this invention to provide an improved converter or decoder for a self-clocking information signal of the delay-modulation type which does not require an establishment of the phase of an extracted timing wave at solely the time of occurrence of a preamble.

It is another object to provide an improved converter or decoder for a self-clocking delay-modulation signal, the converter including means to insure that the phase of an extracted timing wave will, if wrong, be corrected whenever a "101" bit sequence may occur, whether intentionally or incidentally as a part of the information message.

In accordance with an example of the invention, there is provided a converter for utilizing a self-clocking input information signal in which a transition occurs at the middle of a bit cell representing a "1" and a transition occurs between bit cells representing two successive "0's." The converter includes timing means to extract from the input signal a timing wave having a period equal to the bit cell period and having one of two possible phases. If the extracted timing wave has the correct phase, a decoding means utilizes the timing wave to correctly identify the transitions of the input signal which represent "1's" and the transitions which represent partitions between adjacent bit cells containing "0's."

If the extracted timing wave has the wrong phase, a phase correcting means is operative on the occurrence at the output of the decoding means of two successive "0's" without an intervening partition transition to detect the fact that the phase of the timing wave is wrong and to change the phase of the timing wave. Thereafter, the output of the decoding means is correct. The output of the decoding means incorrectly indicates two successive "0's" without an intervening transition when the correct information is a "101" bit pattern. The phase correcting means operates whenever the "101" bit sequence occurs, whether intentionally in a preamble or incidentally as a part of the information message.

Figure 2:
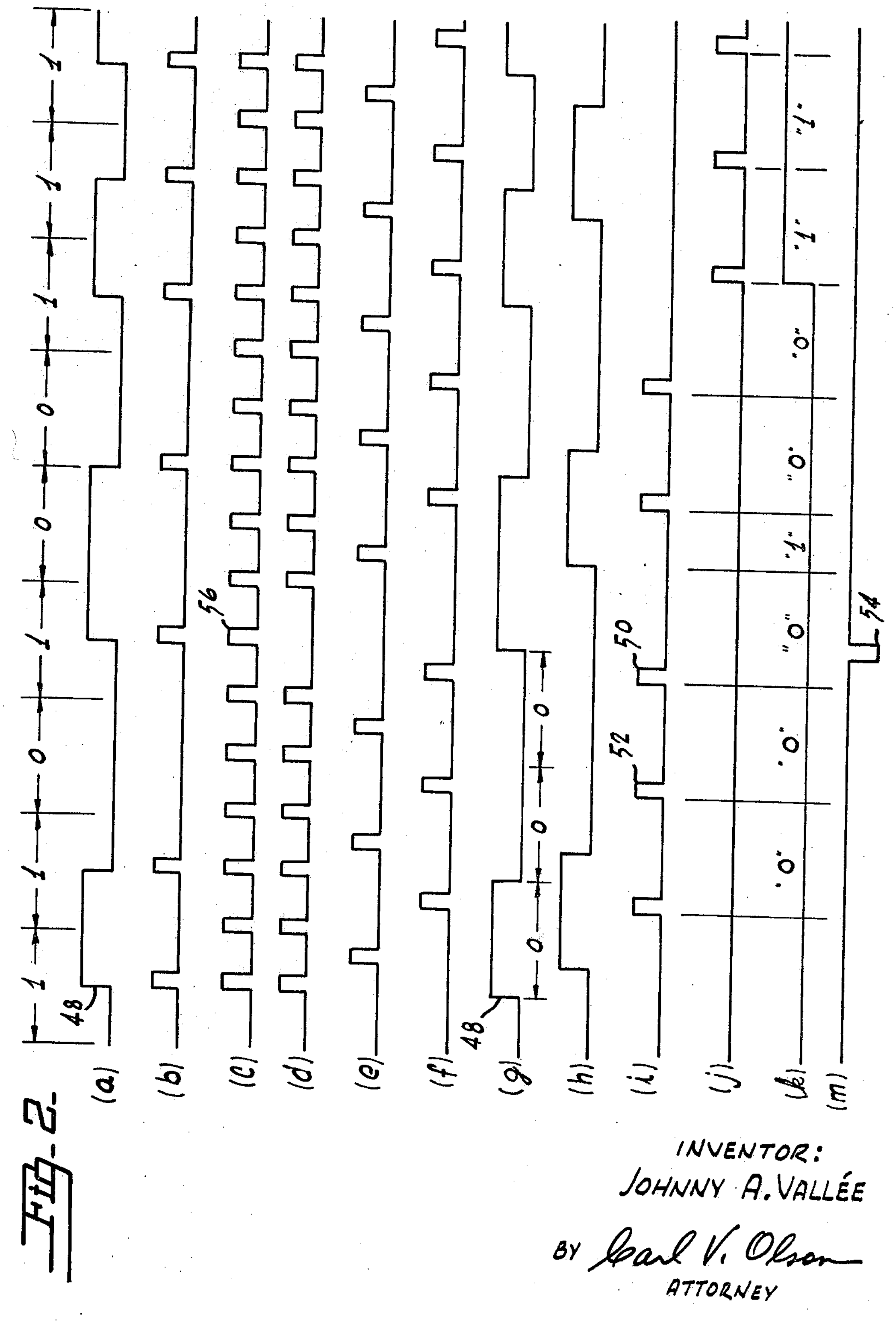

In the drawing:

FIG. 1 is a diagram of a converter constructed according to the teachings of the invention; and FIG. 2 is a chart of voltage waveforms which will be referred to in describing the operation of the system of FIG.1.

Referring now in greater detail to FIG. 1 of the drawing, there is shown a storage medium 10 which, for example, may be a tape or drum arranged for motion relative to a signal transducer such as a magnetic reading head 12. The reading head includes a coil 13 in which electrical signals are induced in accordance with magnetic variations recorded on the magnetic medium 10. The electrical signal is applied over lead 14 to a conventional signal shaper 15 having an output at 16 which may be as represented by FIG. 2*a*.

The signal from the signal shaper 15 is applied to a conventional transition detector and pulse generator 17 having an output at 18 which may be as represented by FIG. 2*b*. The output 18 of pulse generator 17 is connected to the synchronizing input of an oscillator 20. Oscillator 20 includes an "or" gate $G_1$, a delay unit $D_1$ and an amplifier A. The delay provided by the delay $D_1$ is made equal to one-half the period of a bit cell of the reproduced information signal of FIG. 2*a*. A pulse applied to the synchronizing input of the oscillator is recirculated in the oscillator to provide an output at 22 consisting of continuously repeating pulses (FIG. 2*c*) having a frequency equal to twice the information bit repetition frequency of the information previously recorded on the magnetic medium 10.

The output 22 of the oscillator 20 is connected to a frequency divider 24 including a triggerable flip-flop TF, an "and" gate $G_2$ and an "and" gate $G_3$. The oscillator output 22 is coupled through normally-enabled gate $G_2$ to the trigger input T of triggerable flip-flop TF. The "1" output of triggerable flip-flop TF and the oscillator output 22 are connected to inputs of an "and" gate $G_3$. Gate $G_3$ is enabled during alternate ones of the output pulses from the oscillator 20. The output 26 from $G_3$ is therefore a timing wave having a frequency equal to one-half the frequency of the oscillator 20, and having a period between pulses equal to the period of an information signal bit cell.

The timing pulse wave at the output 26 of the gate $G_3$ is coupled through a delay unit $D_2$ providing a delay of about one-fourth of the period of an information bit cell. The delayed timing wave (FIG. 2*e*) at the output 30 of delay unit $D_2$ is applied to inputs of "and" gates $G_6$ and $G_7$ in a decoder 31. The delayed timing wave at 30 is also applied through an additional delay unit $D_3$ to inputs of "and" gates $G_8$, $G_9$, $G_{10}$ and $G_{11}$ in the decoder 31. The delay unit $D_3$ provides a delay equal to about one-half of the period of an information bit cell, so that the timing wave at the output 32 of the delay unit $D_3$ is as shown in FIG. 2*f*.

The output at 16 from the pulse shaper 15 is also connected over line 33 to inputs of the gates $G_6$, $G_8$ and $G_9$, and in inverter $I_1$. The output of inverter $I_1$ is connected to inputs of the gates $G_6$, $G_{10}$ and $G_{11}$.

The decoder 31 also includes a first flip-flop $F_1$ and a second flip-flop $F_2$. The outputs of gates $G_6$ and $G_7$ are connected to set and reset inputs, respectively, of flip-flop $F_1$. The "1" output 34 of flip-flop $F_1$ is connected to inputs of gates $G_9$ and $G_{11}$. The "0" output 35 of flip-flop $F_1$ is connected to inputs of gates $G_8$ and $G_{10}$. The outputs of gates $G_8$ and $G_{11}$ are connected to the set input 38 of flip-flop $F_2$. The output of gates $G_9$ and $G_{10}$ are connected to the reset input 40 of flip-flop $F_2$. The "1" output 41 of flip-flop $F_2$ provides a decoded NRZ output signal having a low value representing "0's" and a high value representing "1's." This NRZ signal, and the timing wave on lead 30' can be applied to the signal and shift inputs, respectively, of a conventional shift register.

The signal at the reset input 40 of flip-flop $F_2$ is also applied over line 42 and through a delay unit $D_4$ to the reset input 46 of a flip-flop $F_3$. The line 42 and the "0" output 43 of flip-flop $F_3$ are connected to inputs of an "and" gate $G_{12}$. The output of Gate $G_{12}$ is connected through a delay unit $D_5$ and an inverter $I_2$ to an input 44 of gate $G_2$. The output 18 of pulse generator 17 is connected over lead 47 to the set input of flip-flop $F_3$.

The operation of the system shown in FIG. 1 will be described with the assumption that the information which was recorded on the storage medium 10 consists of the binary sequence 1 1 0 1 0 0 1 1 1, with each bit located in a respective bit cell as shown at the top of FIG. 2. This information recorded on medium 10 results in an induced electrical signal in the transducer which, after passing through signal shaper 15, appears as shown in FIG. 2*a*. The signal of FIG. 2*a* is applied to transition detector and pulse generator 17 to produce at its output 18 a wave (FIG. 2*b*) which includes a pulse at the time of every transition of the information signal of FIG. 2*a*.

The signal of FIG. 2*b* is applied to oscillator 20 to produce, at the output 22 of the oscillator, a double-frequency wave (FIG. 2*c*) having a period equal to one-half of a bit cell. The output 22 of the oscillator is applied to a frequency divider 24 to produce a pulse wave at the output 26 of the frequency divider which has a period equal to one bit cell. In the operation of the frequency divider 24, the output of oscillator 20 is applied through normally-enabled gate $G_2$ to the trigger input T of triggerable flip-flop TF. Every other time the flip-flop is triggered, its "1" output 25 enables gate $G_3$ to pass every other oscillator pulse applied to it over line 23. The frequency-divided wave at 26 is slightly delayed in delay unit $D_2$ to produce a timing wave at 30 which is as shown in FIG. 2*e*.

The wave of FIG. 2*a* at the output of the signal shaper 16 is also applied over line 33 to the input of decoder 31. The wave of FIG. 2*a* and its complement at the output of inverter $I_1$ are gated through gates $G_6$ and $G_7$ to the set and reset inputs of flip-flop $F_1$ at the time of pulses of the wave of FIG. 2*e*. Therefore, the signal at the output 34 of flip-flop $F_1$ as shown in FIG. 2*h* is a slightly delayed version of the signal of FIG. 2*a* (which is repeated in the drawing as FIG. 2*g*). The gates $G_8$ through $G_{11}$ are used to compare the information signal of FIGS. 2*a* and 2*g* with the delayed information signal of FIG. 2*h* at the times of the timing pulses (FIG. 2*f*) on line 32 derived from delay unit $D_3$. If the information signal (FIG. 2*g*) and the delayed information signal (FIG. 2*h*) have different values at the time of a pulse of the wave of FIG. 2*f*, gate $G_8$ or gate $G_{11}$, pass a pulse (FIG. 2*j*) to the set input 38 of flip-flop $F_2$. On the other hand, if the information signal (FIG. 2*g*) and the delayed information signal (FIG. 2*h*) are the same at the time of a pulse of FIG. 2*f*, gates $G_9$ and $G_{10}$ pass a pulse (FIG. 2*i*) to the reset input 40 of flip-flop $F_2$. The output 41 of flip-flop $F_2$ then provides a simple non-return-to-zero (NRZ) information signal as shown in FIG. 2*k*.

The operation of the decoder 31 including flip-flops $F_1$ and $F_2$ and the associated gates $G_6$ through $G_{11}$ act to compare the information signal during the first half of a bit cell with the information signal during the second half of a bit cell to determine whether there was a transition in the middle of the bit cell representing the storage of a "1" information bit. In the absence of such a central transition, it is assumed that the bit cell contains a "0".

According to the example being described, the first four bits stored on the magnetic medium 10 are the information bits 1 1 0. The information signal of FIGS. 2*a* and 2*g* contains transitions at the centers of the first two bit cells to represent the storage of two "1's." The first two transitions representing "1's" are actually ambiguous in that the two transitions could represent transitions between successive bit cells containing "0's," as shown between FIGS. 2*g* and 2*h*. Therefore, it is possible to interpret the first three information bits of the information signal to represent 0 0 0 instead of 1 1 0. The first signal transition 48 was used to start the oscillator 20, with the result that the frequency-divided timing waves of FIGS. 2*e* and 2*f* have phases which are incorrect and which result in an incorrect NRZ signal output at 41 of the flip-flop $F_2$. The first three bits at the output 41 are incorrectly interpreted to be 0 0 0 when they actually represent 1 1 0.

The second two of the first three "0" bits of the NRZ decoded output are recognized to be erroneous outputs by the phasing circuit including flip-flop $F_3$. The phasing circuit recognizes the error because the decoded output signal violates the rule that there must be an input signal transition between two consecutive bit cells containing "0's."

In the operation of the phasing circuit, the signal at the reset input 40 of flip-flop $F_2$ is a wave (FIG. 2*i*) consisting of pulses each of which precedes an output bit cell containing a "0" bit. The pulses of the wave of FIG. 2*i* are applied over line 42 and through delay unit $D_4$ to the reset input 46 of flop-flop $F_3$. The delay unit $D_4$ provides a delay greater than the pulse width so that a pulse on lines 42, 45 terminates before the same pulse passes through delay unit $D_4$ and line 46 to reset the flip-flop $F_3$. The only time that a pulse is passed by the gate $G_{12}$ is when the flip-flop $F_3$ was reset by a previous pulse and was not set by an intervening pulse over line 47 from the output of the transition detector and pulse generator 17. A pulse 50 in the pulse wave of FIG. 2*i* does pass through the gate $G_{12}$ because there was no flip-flop setting pulse in the wave of FIG. 2*b* in the interval since the preceding pulse 52 in the pulse wave of FIG. 2*i*.

The pulse 50 (FIG. 2*i*) passed through the gate $G_{12}$ is delayed by delay unit $D_5$ and inverted by the inverter $I_2$ so that it is translated to a pulse 54 (FIG. 2*m*) which inhibits the gate $G_2$ for the duration of the pulse 54. The pulse 54 coincides in time with the pulse 56 of the wave of FIG. 2*c*. The blocking in gate $G_2$ of the pulse 56 removes one corresponding pulse from the oscillations (FIG. 2*d*) at the output of gate $G_2$ applied to the trigger input of triggerable flip-flop $TF_1$. The removal of the one trigger input to the triggerable flip-flop $TF_1$ causes the phase of the wave of the frequency-divided waves of FIGS. 2*e* and 2*f* to be slipped or delayed an amount equal to one-half of a bit cell period. Stated another way, the frequency-divided waves of FIGS. 2*e* and 2*f* are shifted 180° in phase. Thereafter, the timing waves of FIGS. 2*e* and 2*f* result in the correct decoding of the remaining bits of the information signal. During the change-over from incorrect phase to correct phase of the timing waves, an intermediate information bit designated "1" is lost. However, the following bits 0 0 1 1, etc., are correctly reproduced at the NRZ output 41 as shown by the wave of FIG. 2*k*.

The decoding system will continue correctly decoding the information signal. If for any reason, the timing waves should get out of phase, the occurrence in the input signal of a 1 0 1 information bit pattern will be decoded as two "0" bits without an intervening signal transition, and will automatically result in a correction of the phases of the timing waves of FIGS. 2*e* and 2*f*. In this way, the intentional or incidental occurrence of a 1 0 1 sequence of information bits will always result in a following correct decoding of the information signal.

What is claimed is:

1. A converter for converting a self-clocking input information signal in which a transition occurs at the middle of a bit cell representing a "1" and a transition occurs between bit cells representing two successive "0's" to an NRZ signal, comprising timing means receptive to said input signal and operative to extract from said input signal a timing wave having a period equal to said bit cell period and having one of two possible phases, decoding means receptive to said input signal and to said timing wave to identify the transitions of said input signal which represent "1's" and the transitions which represent partitions between adjacent bit cells containing "0's,"

means for detecting the occurrence at the output of said decoding means of two successive "0's" without an intervening partition transition in the input signal, indicative of an out-of-phase condition of said timing wave, and for producing a correction signal indicative of said occurrence, and means responsive to the correction signal from said detecting means for changing the phase of said timing wave upon the receipt of said correction signal.

2. A converter as defined in claim 1 wherein said timing means includes means to generate two timing waves of the same frequency but of different phases, and wherein said decoding means utilizes both of said timing waves.

3. A converter as defined in claim 2 wherein said decoding means includes a first flip-flop receptive under control of one timing wave to said input information signal, and a second flip-flop receptive under control of the other timing wave to the output of said first flip-flop.

4. A converter as defined in claim 3 and including an input signal transition detector and pulse generator.

5. A converter as defined in claim 4 wherein said timing means includes an oscillator synchronized from the output of said transition detector and pulse generator.

6. A converter as defined in claim 5 wherein said detecting means receives the output of said transition detector and pulse generator and receives a signal applied to said second flip-flop.

References Cited

UNITED STATES PATENTS

| | | | |
|---|---|---|---|
| 3,217,329 | 11/1965 | Gabor | 346—74 |
| 3,391,400 | 7/1968 | Chao | 340—174.1 |
| 3,414,894 | 12/1968 | Jacoby | 340—347 X |

MAYNARD R. WILBUR, Primary Examiner

G. R. EDWARDS, Assistant Examiner

U.S. Cl. X.R.

235—154